(12) United States Patent
De Spiegeleer et al.

(10) Patent No.: US 7,478,113 B1
(45) Date of Patent: Jan. 13, 2009

(54) BOUNDARIES

(75) Inventors: Kristof De Spiegeleer, Knokke-Heist (BE); Koen D'hondt, The Hague (BE)

(73) Assignee: Symantec Operating Corporation, Cupertino, CA (US)

( * ) Notice: Subject to any disclaimer, the term of this patent is extended or adjusted under 35 U.S.C. 154(b) by 296 days.

(21) Appl. No.: 11/403,561

(22) Filed: Apr. 13, 2006

(51) Int. Cl.
*G06F 17/30* (2006.01)
*G06F 12/00* (2006.01)

(52) U.S. Cl. .................. 707/200; 707/204; 707/205

(58) Field of Classification Search .......... 707/5, 707/6, 102, 204, 205, 200; 235/435; 709/238
See application file for complete search history.

(56) References Cited

U.S. PATENT DOCUMENTS

| | | | | |
|---|---|---|---|---|
| 5,561,421 | A * | 10/1996 | Smith et al. | 341/51 |
| 6,141,784 | A * | 10/2000 | Davis et al. | 714/748 |
| 7,146,429 | B2 * | 12/2006 | Michel | 709/238 |
| 2005/0027766 | A1 * | 2/2005 | Ben et al. | 708/300 |
| 2007/0198659 | A1 * | 8/2007 | Lam | 709/219 |

* cited by examiner

*Primary Examiner*—Don Wong
*Assistant Examiner*—Merilyn P Nguyen
(74) *Attorney, Agent, or Firm*—Meyertons Hood Kivlin Kowert & Goetzel, P.C.

(57) ABSTRACT

A data backup system can be operable to determine whether to send a data file segment to backup storage. The data backup system can comprise a comparator operable to compare a boundary parameter of a candidate segment proposed for sending to backup storage to a boundary parameter of a previously stored segment to determine whether the candidate segment potentially corresponds to the previously stored segment. The data backup system can also comprise a comparator operable, if it is determined that the candidate segment potentially corresponds to the previously stored segment, to compare a checksum value for the candidate segment to a checksum value for the previously stored segment to determine whether the candidate segment has previously been stored to the second location. A storage engine can be provided to send to backup storage a segment determined not to have previously been stored. Thereby a single instance store can be implemented whereby a modified segment can be identified and a segment boundary adjusted to avoid re-storage of previously stored data.

19 Claims, 8 Drawing Sheets

BOUNDARIES

FIELD

The present invention relates to boundaries, and in particular, but not exclusively to flexible and/or movable boundaries for large data object segmentation in a data archival and/or backup environment.

BACKGROUND

In data archival and/or backup environments, there is often a need to store large data objects such as large files within an archival/backup system. Examples of such large data objects which may be found in many office environments include ".pst" files from Microsoft Outlook™.

In some data archival and/or backup systems, large files are split into a number of equal sized units commonly known as segments. In this way, when data is appended to a file which has already been archived/backed-up, a later archival/backup operation need only create segments corresponding to the new data. This solution is particularly useful for files such as MSOutlook™ .pst files which may have many kilobytes or megabytes appended in a single day if a user receives or sends a number of large messages in that day. By using such a solution, an amount of data for archival or backup can be substantially reduced by avoiding making archival/backup copies of previously archived/backed-up data.

Known techniques for performing such segmented archival/backup operations typically divide the file for archival/backup into a number of segments of a predetermined size starting at the beginning of the file. The final segment may therefore be smaller than the predetermined size if the file's total size is not an exact multiple of the predetermined segment size. Each such segment is then compared to already stored segments of that file to determine whether it has already been archived/backed-up. Only segments which do not correspond exactly to previously stored segments are then archived/backed-up.

The present invention has been made, at least in part, in consideration of drawbacks and limitations of such conventional systems.

SUMMARY

Viewed from a first aspect, the present invention provides a system operable to determine whether to store a segment of a data object to a backup system. The system can comprise a candidate segment generator operable to generate a plurality of candidate segments from a selected trial segment of a selected data file, each candidate segment corresponding to a start position offset from the start of the trial segment and having data appended thereto from a next segment of the selected data file as necessary to maintain a constant candidate segment size. The system can also comprise a comparator operable to compare a boundary parameter of each candidate segment to a boundary parameter of a previously stored segment to determine whether the candidate segment potentially corresponds to the previously stored segment, and a comparator operable, if it is determined that a candidate segment potentially corresponds to the previously stored segment, to compare a segment identifier value for the candidate segment to a segment identifier value for the previously stored segment to determine whether the candidate segment is the same as the previously stored segment. The system can also comprise a storage engine operable to send to backup storage a trial segment if none of the candidate segments generated therefrom are determined to have previously been stored. Thereby a segment can be compared, based not only upon its indicative characteristic in the form of a checksum value, but also a boundary identifier of the segment. Thereby a segment that is shifted relative to a previous position can still be identified by means of the boundary identifier. A range of relative positions of the candidate and reference segments can be tried, to maximise the probability of accurately identifying a previously stored segment. In such a system, the candidate segment can be extended by using data from a next candidate segment from a candidate data object to ensure that the candidate and previously stored segments remain the same size even when an offset is applied. Thereby a direct comparison between possibly matching segments can be performed.

In one embodiment, the segment identifier value is at least one of a cyclic redundancy check value and a hash function value. Thereby a reliable indicator of the content of the data object can be used to identify whether a segment is unique.

In one embodiment, the boundary parameter of the segment is calculated by performing a semantic analysis of the segment. In one embodiment a semantor can be provided to perform the semantic analysis of the segment. Thereby a reliable identifier of a segment boundary can be calculated to enable different relative alignments of the candidate and previously stored segments to be tested.

In one embodiment the semantic analysis is performed such that a boundary parameter for a given segment of a data object is different to a boundary condition for all other segments of that data object. Thereby a unique boundary parameter can be ensured for all segments of a given data object.

In one embodiment the semantic analysis is performed such that at least one predetermined byte pattern in a segment is excluded when determining the boundary parameter therefor. The at least one predetermined byte pattern can include a repetitive byte sequence. Thereby a unique boundary condition can be determined for all unique segments of a given file even where a large amount of null data is included in the segment. A record of ignored bytes can be included in the boundary condition or in an object representation associated with the data object. Thereby the boundary parameter can be easily recreated on a test segment so as to allow direct comparison of different segments.

In one embodiment the boundary parameter and segment identifier value for the previously stored segment are stored in a data object representation for the previously stored data object to which the segment belongs. Thereby a data object representation much smaller in size than the original stored data object can be used when testing a candidate data object against a previously stored data object.

In one embodiment the comparator can be further operable, in the event of it being determined that a candidate segment corresponds to the previously stored segment, to output an indication of the offset value at which the match was determined. In one embodiment a segment creator can be provided to create a new segment containing contiguous data from the start of the candidate segment having a size equal to the offset value. Thereby the new data which caused the offset between the candidate and previously stored segments to occur can be captured and stored to the second location as a new segment.

In one embodiment a segment consolidator can be provided to consolidate the new segment with one of a previous segment and a next segment. Thereby, a new segment of small size can be combined with either the preceding or following segment of the data object in order to prevent excessive fragmentation of the data object. In one embodiment, the segment consolidator is operable to perform the consolidation if the consolidated segment would have a size less than or equal to a predetermined maximum segment size. Thereby the consolidation process can be performed subject to a condition not to exceed a maximum allowed segment size.

In one embodiment the first location is a computer file system, in which the data object has been stored by a user or process. In one embodiment the second location is a backup environment for storing data present in the computer file system. In one embodiment the previously stored segment is a segment of a previously stored version of the selected data file.

Viewed from another aspect, the present invention provides a data object storage system operable to store a data object from a first location to a second location. The system can comprise a segmenter operable to divide a data object larger than a predetermined threshold size into a plurality of trial segments using a predetermined segment size and a candidate segment generator operable to generate a plurality of candidate segments from a selected trial segment, each candidate segment corresponding to a start position offset from the start of the trial segment and having data appended thereto from a next trial segment of the data object if necessary to maintain a constant candidate segment size. The system can also comprise a comparator operable to compare a boundary parameter of each candidate segment to a boundary parameter of a previously stored segment to determine whether the candidate segment potentially corresponds to the previously stored segment, and a comparator operable, if it is determined that a candidate segment potentially corresponds to the previously stored segment, to compare a segment identifier value for the candidate segment to a segment identifier value for the previously stored segment to determine whether the candidate segment is the same as the previously stored segment, and a storage engine operable to store to the second location a trial segment if none of the candidate segments generated therefrom are determined to have previously been stored to the second location. Thereby a segment can be compared, based not only upon its indicative characteristic in the form of a checksum value, but also a boundary identifier of the segment. Thereby a segment that is shifted relative to a previous position can still be identified by means of the boundary identifier. A range of relative positions of the candidate and reference segments can be tried, to maximise the probability of accurately identifying a previously stored segment. In such a system, the candidate segment can be extended by using data from a next candidate segment from a candidate data object to ensure that the candidate and previously stored segments remain the same size even when an offset is applied. Thereby a direct comparison between possibly matching segments can be performed.

Viewed from a further aspect, the present invention provides a method for identifying data object segments for inclusion in single instance storage. The method can comprise generating a plurality of candidate segments from a selected trial segment of a selected data object, each candidate segment corresponding to a start position offset from the start of the trial segment and having data appended thereto from a next segment of the selected data object as necessary to maintain a constant candidate segment size, and comparing a boundary parameter of each candidate segment to a boundary parameter of a previously stored segment to determine whether the candidate segment potentially corresponds to the previously stored segment. The method can also comprise, if it is determined that a candidate segment potentially corresponds to the previously stored segment, comparing a segment identifier value for the candidate segment to a segment identifier value for the previously stored segment to determine whether the candidate segment is the same as the previously stored segment. Thereby a data object segment can be accurately tested against previously stored segments to determine whether a segment has already been included in the single instance storage. A segment can be compared, based not only upon its indicative characteristic in the form of a checksum value, but also a boundary identifier of the segment. Thereby a segment that is shifted relative a previous position can still be identified by means of the boundary identifier. A range of relative positions of the candidate and reference segments can be tried, to maximise the probability of accurately identifying a previously stored segment. In such a system, the candidate segment can be extended by using data from a next candidate segment from a candidate data object to ensure that the candidate and previously stored segments remain the same size even when an offset is applied. Thereby a direct comparison between possibly matching segments can be performed.

In one embodiment, the method can further comprise creating a new segment containing contiguous data from the start of the candidate segment having a size equal to the offset value. Thereby, a new segment of small size can be combined with either the preceding or following segment of the data object in order to prevent excessive fragmentation of the data object. In one embodiment the method can further comprise consolidating the new segment with one of a previous segment and a next segment. Thereby the consolidation process can be performed subject to a condition not to exceed a maximum allowed segment size.

Viewed from another aspect, the present invention provides a data backup system operable to determine whether to send a data file segment to backup storage. The system can comprise: a comparator operable to compare a boundary parameter of a candidate segment proposed for sending to backup storage to a boundary parameter of a previously stored segment to determine whether the candidate segment potentially corresponds to the previously stored segment; a comparator operable, if it is determined that the candidate segment potentially corresponds to the previously stored segment, to compare a checksum value for the candidate segment to a checksum value for the previously stored segment to determine whether the candidate segment has previously been stored to the second location; and a storage engine operable to send to backup storage a segment determined not to have previously been stored. Thereby a file segment can be identified for inclusion in the data backup system if it does not match any existing segment in the data backup system, even where the segments do not align perfectly due to alterations in the data content of the data file.

BRIEF DESCRIPTION OF THE FIGURES

Particular embodiments of the present invention will now be described, by way of example only, with reference to the accompanying drawings in which like parts are identified by like reference numerals.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

SPECIFIC DESCRIPTION

Figure 1:
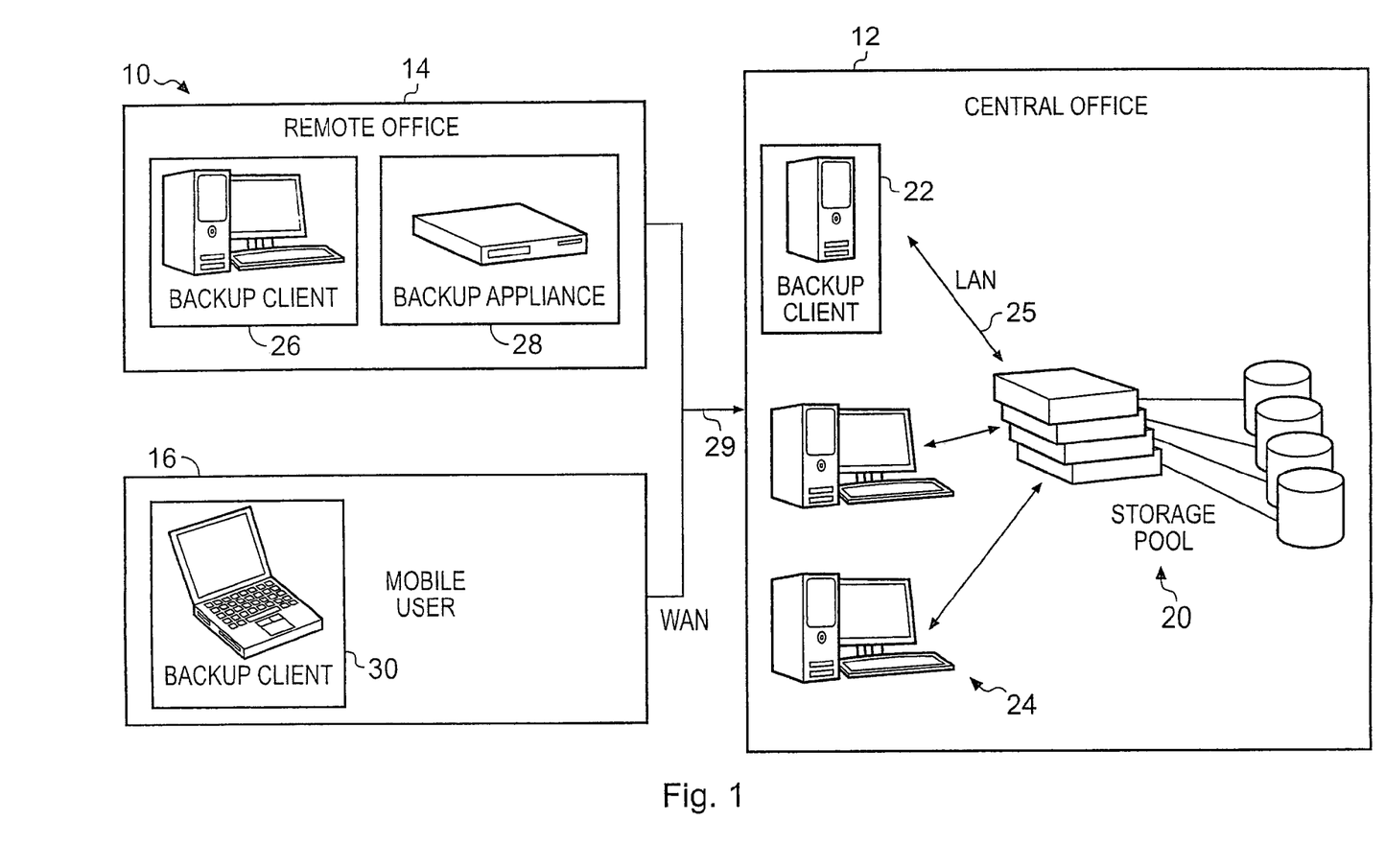
FIG. 1 shows a schematic representation of a distributed computing environment in which a data backup process may be used.

As shown in FIG. 1, a distributed computing environment 10 may include a central office 12, and may also include one or more remote offices 14 and/or one or more remote users 16. The central office 12 may include a storage pool 20 into which data may be backed up. Management of a backup process may be performed by a backup client 22 on behalf of one or more local workstations 24. Backup data can be passed to the storage pool 20 via a LAN (local area network) 25

A remote office 14 may include one or more backup clients 26, which may be dedicated backup co-ordinators, or a backup client may be provided on workstation. By means of this backup client 26, data can be backed-up onto a remote office backup appliance 28. The backup appliance 28 can then transfer backup data to the storage pool 20 at the central office over WAN (wide area network) link 29.

A mobile user 16 may be provided with a backup client 30 to run on a remote terminal. This backup client 30 can send backup data to the storage pool 20 of the central office 12 via the WAN link 29.

In the present example, the amount of backup data to be transmitted over the LAN 25 and WAN 29 is limited by ensuring that only unique data is sent to the backup storage pool 20. Techniques for achieving this will be explained in more detail below.

Figure 2:
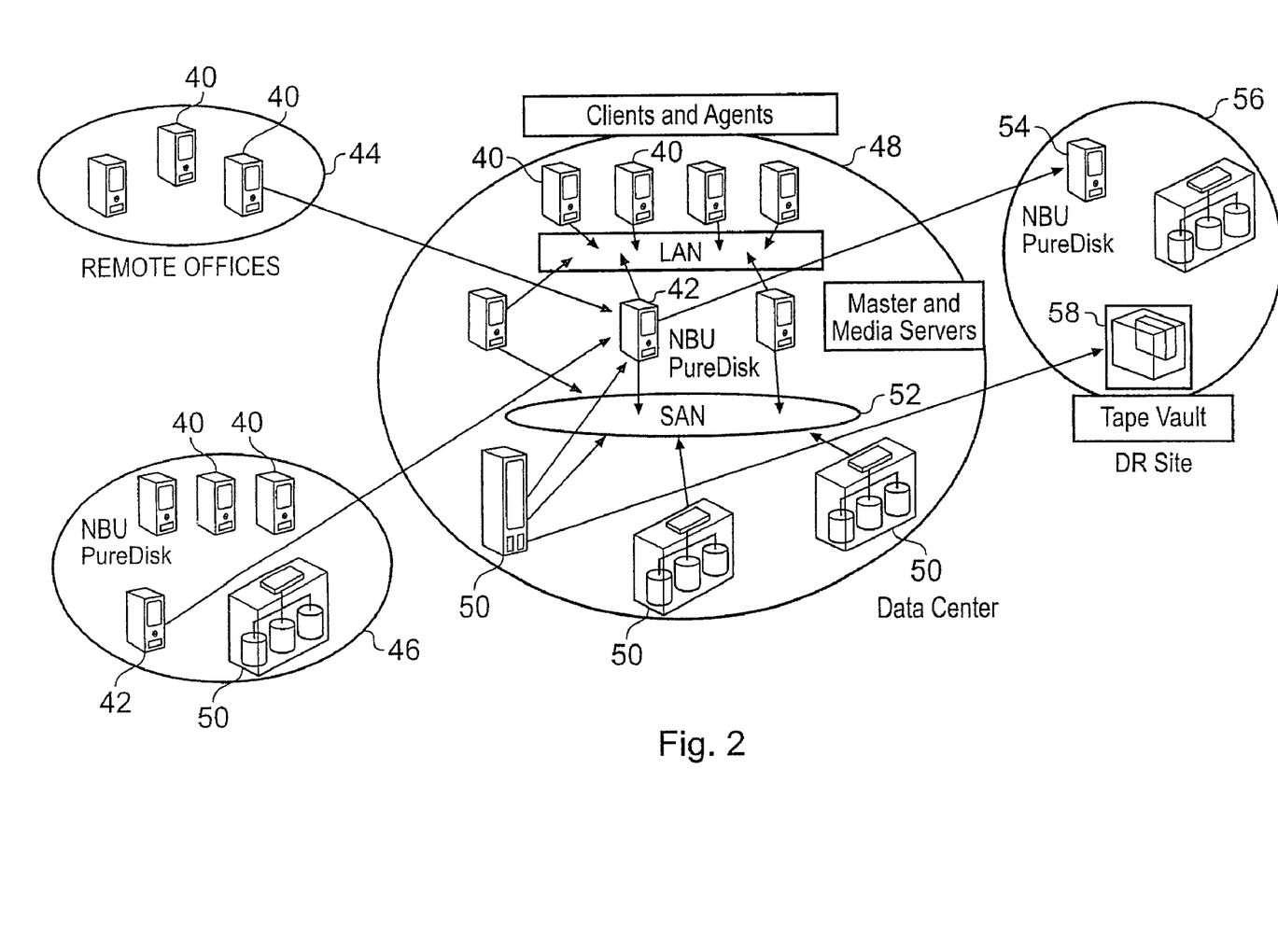
FIG. 2 shows a schematic representation of another distributed computing environment in which a data backup process may be used.

FIG. 2 shows another example implementation of a distributed computing environment. In this example, some workstations and mobile users are associated with respective local backup servers, each of which is operable to communicate with a data centre where backup storage is performed.

As shown in FIG. 2, in the present example, each computer system 40 which is to be included in the backup system runs a backup client, which may also be referred to as an agent. Each local agent identifies new and changed files or file segments as they are created and calculates a fingerprint for each file or file segment. The agents can be configured to ignore files which do not require backup such as, for example, print spool files, operating system file or temporary files.

In the present example, files larger than a predetermined threshold are divided into segments. This allows large files to be backed up more efficiently. For example, a file such as an MSOutlook™ .pst file typically contains a large amount of data which remains constant and has new data appended thereto when a user sends or receives an email or makes a calendar entry, for example. Thus, when a backup operation is performed in segmented fashion, all of the segments at the beginning of the file which are unchanged need not be backup up again. This process is illustrated in FIG. 3.

Figure 3:
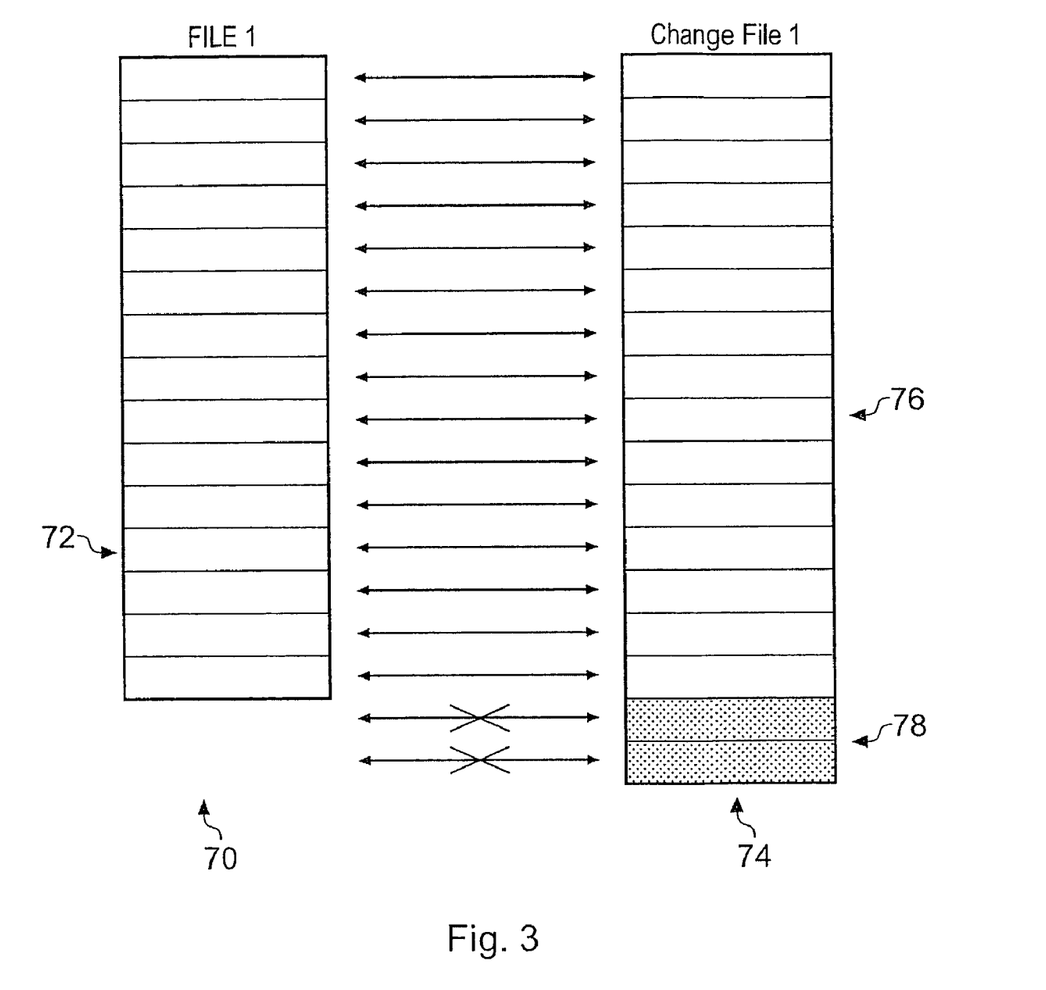
FIG. 3 shows a schematic representation of how a data file may be modified between two time points.

As shown in FIG. 3, a file 70 when last backed up was backed up as a number of backup segments 72. When a next backup operation is performed the file has increased in size to new file 74. During this backup operation, a backup agent again considers the file as a number of segments, each of which has a fingerprint calculated therefor. By comparing these fingerprints to the fingerprints included in previous backups, it can be determined that all of segments 76 have previously been backed-up and so do not require re-storing in a backup system. On the other hand, the new segments 78 have not previously been backed-up and so can be sent for backup storage. By using such a technique, the amount of data sent for backup storage on a backup operation can be reduced massively from a system where all changed files are sent for backup every time.

In the following description, the words file and segment may be used interchangably to refer to backup data units. It will be appreciated that where a file is smaller than the predetermined segment size, the file can be considered to be segmented into a single segment. In the present examples, a variety of segment sizes can be used. As will be appreciated smaller segment sizes increase the efficiency of the backup process but increase the processing workload by the backup agent. In some examples, segment sizes of 32 kbytes, 64 kbytes or 128 kbytes can be used.

The fingerprint determined by the agent uniquely identifies the file or file segment. Thus no two non-identical files or segments can have the same fingerprint, and identical files or segments always have the same fingerprint. In the present example, the fingerprint is calculated using a hash function. Hash functions are mathematical functions which can be used to determine a fixed length message digest or fingerprint from a data item of any almost size. A hash function is a one way function—it is not possible to reverse the process to recreate the original data from the fingerprint. Hash functions are relatively slow and expensive in terms of processing power required compared to other checksum techniques such as CRC (Cyclic Redundancy Check) methods. However hash functions have the advantage of producing a unique fingerprint for each unique data set, in contrast to CRC methods which can produce the same result from multiple different data sets. Examples of hash functions which can be used to calculate the fingerprint in the present example include MD5, SHA1 and the so-called SHA2 "family" (including SHA224, SHA256, SHA 384 and SHA 512). Such hash functions produce a fingerprint (sometimes termed a "digest") which may typically be of between 128 and 1024 bits in length. Thus, as will become apparent, using only this very small representation of a much larger file or file segment, the file or segment can be tested for inclusion in a backup process with only minimal network traffic being required to carry this small signature between entities in the backup system.

The agent at each workstation 40 then identifies the files or segments which are new and unique to that workstation. Thus, if a newly created file or segment at the workstation in fact is an exact copy of a file or segment previously backed-up, then the agent knows not to send that segment for backup again.

Once the agent has identified a unique segment at the workstation 40, the fingerprint for that segment can be sent to a backup server 42, where its uniqueness can again be tested. This re-test is performed to determine whether the file which is unique to a particular workstation 40 is also unique to all workstations which that backup server 42 services. The backup server may be a local backup server as shown in remote office 46 or as shown in central network 48 with respect to the workstations 40 located within the central network 48. Alternatively, the backup server may be a remote backup server as shown in central network 48 with respect to the workstations 40 located at remote office 44. Where a workstation 40 is a mobile workstation such as a laptop, the backup agent on the mobile workstation may be configured always to connect to the same backup server, or may connect to whichever backup server is physically closest to the mobile workstation at a given time.

This process of sending a fingerprint to a higher level authority within the backup structure can be continued until the highest level authority is reached. In a large system, this might be a central backup server to which a number of local backup servers are connected. In a small system, there might be only a single backup server to service all workstations. If the fragment is determined to be unique within the backup system, the originating workstation agent can be instructed to send the actual data segment for backup.

Segments which are not unique may also have their fingerprint sent to a backup server by a backup agent. This may be the case in a system where a data retention policy is defined, to ensure that a file or segment is maintained in backup storage for a minimum period after the last time it was present on any workstation within the backup environment. In some examples it may also be necessary to ensure that all segments of a given file are present in the backup system until the expiry of a data retention requirement for that file. Thus all segments of a file may need to be kept until the end of a data retention policy period, not just the last modified segments thereof.

It will be appreciated that the workstations 40 of the present example may include file or application servers where data requiring backup is stored. For example, it may be the case that file servers are used to store many data files, so the content of these may be required to be backed up. In the example of an application server such as a MSExchange™ server, the application server may store data relating to the application and may therefore require backup. Also, application files, whether located at a workstation or a server, may require backup coverage, for example to provide a straight-forward method for recovery of custom settings or rebuilding of a workstation or server following a system failure.

As mentioned above, a data retention policy may apply to data within a computer system. Such a policy may be a policy determined by a company or may be imposed by a regulatory authority. Regulator imposed policies may apply, for example in respect of financial information and legal information. For this reason, it may be desirable for a workstation backup agent to include deleted files in the backup operation to ensure that a file with an existence on a workstation of less than one backup interval is still included in the backup process.

As will be appreciated, by performing the backup process in terms of using a fingerprint typically of the order of a few tens of bits in size to determine which segments actually need backing up, the amount of data transferred over network connections between the workstations and backup servers is much reduced compared to a system where data identified for backup is sent for storage before it is determined whether storage of that data is actually required.

Returning to FIG. 2, the backup servers 42 may cause the data for backup to be stored into a storage arrangement such as a storage server 50. The storage servers 50 may be standalone storage servers or may be part of a storage infrastructure such as a SAN (storage area network) 52. In alternative examples the backup server 42 may include the storage for backed up data.

To provide redundancy and greater security and availability for backed up data, a storage server 42 may consist of a mirrored pair of storage servers, with one active and the other acting as a hot standby, ready to take over in case of a failure of the active backup server. A remote mirror 54 may be provided, for example at a remote site 56, to provide resiliency against failures affecting the location of the active backup server. Such a remote site may also be used to make and/or keep backup copies of the backed up data, for example in backup magnetic arrangements or using conventional backup techniques such as a tape vault 58.

Thus there has been described a number of examples of a backup environment for using data fingerprints to identify files and/or segments for backup and to backup only unique files and segments so as to achieve maximum efficiency in usage of backup storage volume.

In order to provide a means for accessing the files and segments in the backup system, the files and segments can be stored in an indexed file system or database structure which allows a file or segment to be identified and retrieved by a search on its fingerprint. The fingerprint may also be considered as a "signature" of the file or segment. Thereby a simple file system or database structure can be used for the files and segments, thereby allowing a swift search and retrieval process.

In order to facilitate searching the contents of a backup store of the type described above, both to assess the contents of the store, and to retrieve data from the store, a database of metadata can be provided. The database of metadata or "metabase" can store data describing each file stored into the backup system. Such data may include information such as filename, last edited date, created date, author, file size and keywords representative of the content of the file. Also stored in the metabase can be the fingerprint (or fingerprints) for the file (or each segment of the file). Thereby, a user searching the metabase for files edited on a particular date can run a query on the metabase, and any returned results can enable the files in the backup system to be retrieved by means of their uniquely identifying fingerprint. A system constructed in this way enables the metabase to have a high speed search performance due to the database size being small compared to the actual backed up file sizes, and allows a simple search procedure to be used for the file/segment database.

In another example, the file/segment and metadata databases are combined into a single database. Such a system offers a simplified structure in the sense that only a single database is required.

Figure 4:
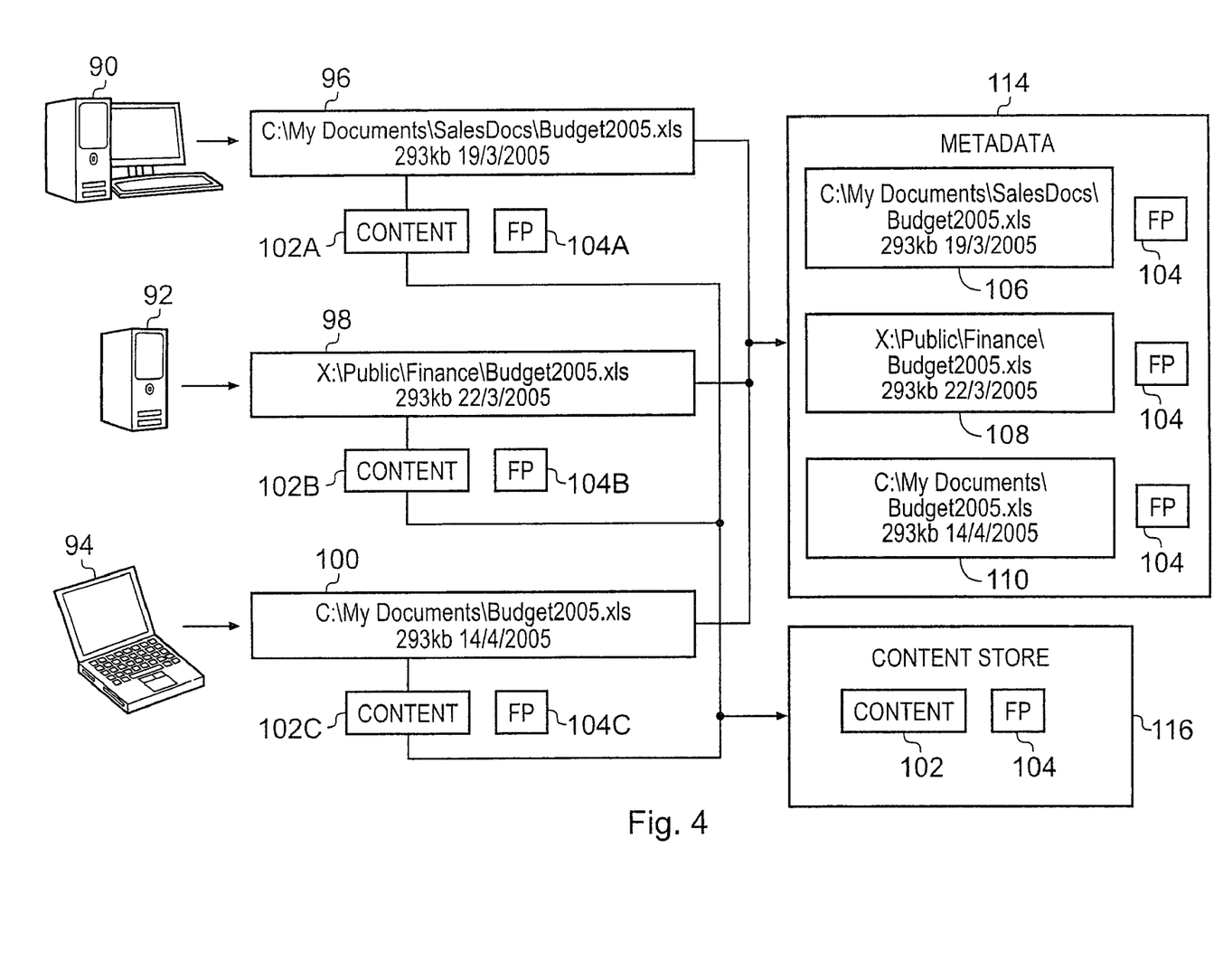
FIG. 4 shows a schematic representation of a single instancing backup system.

Returning to the separate metabase and file/segment store example, this system can be run as a single instancing store by allowing more than one entry in the metabase to include the same fingerprint. This is illustrated in FIG. 4.

In each of the three computer devices: terminal 90, file server 92 and mobile terminal 94, an identical spreadsheet file "Budget2005.xls" is stored. At the terminal 90, the file 96 was stored in the "C:\My Documents\SalesDocs\" folder on 19 Mar. 2005 having a size of 293 kB. At the file server 92, the file 98 was stored in the "X:\Public\Finance\" folder on 22 Mar. 2005 having a size of 293 kB. At the mobile terminal 94 the file 100 was stored in the "C:\My Dcouments\" folder on 14 Apr. 2005 having a size of 293 kB. As the files 96, 98, 100 are identical, they are all the same size, have the same content (102A, 102B, 102C respectively) and result in the same fingerprint FP (104A, 104B, 104C) being generated at a backup operation time.

Backup operations on each of the terminal 90, file server 92 and mobile terminal 94 may be carried out at different times, with the results of the backup of each being added into the backup system at the respective different times. For example, a backup operation for the mobile terminal 94 may be carried out at a time different to the backup operation for the terminal 90 or file server 92 if the mobile terminal 94 remains unconnected to the backup system for a period of time during which a scheduled backup operation took place for the terminal 90 and file server 92.

For the performance of a backup operation for the terminal 90, the fingerprint 104A is calculated for the file 96, which fingerprint 104A is compared to the content store part 116 of the backup system. If the fingerprint is unique in the backup system, then the content 102A of the file 96 needs to be stored into the content store 116, shown as content 102 associated with fingerprint 104. If the fingerprint is not unique in the content store (i.e. if that file has previously been backed-up), then the content need not be stored again. In parallel with determining whether the content 104A needs to be stored, metadata 106 for the file 96 is stored into the metabase 114 if the file 96 has not previously been backed-up. The metadata 106 is stored in association with the fingerprint 104 which identifies the content 102 stored in the content store 116.

Similar processes are carried out when the file 98 on file server 92 and the file 100 on mobile terminal 100 are selected for backup. Thus, once the files 96, 98, 100 have each been included in a backup process, the metabase contains an entry for each of the files, as each has different metadata, but the content store has only a single copy of the file. In an alternative implementation, the metabase could have a single record for each fingerprint, with the record storing the metadata for all original instances of the file which generated the fingerprint.

Thereby, a metabase containing metadata for all original instances of a file can be provided to provide a searchable environment for retrieving files/segments stored in the content store. Meanwhile the content store contains only one instance of each file/segment, so as to limit the storage space required by the content store. The metabase records are linked to the content records in the content store by the fingerprint for each respective content record.

Thus there has now been described a system for providing a content optimised backup and/or archival solution for data networks. The system ensures that all unique data is stored whilst avoiding unnecessary storage of non-unique data. By analysing large data objects in segments, this optimisation is further enhanced.

There will now be described an arrangement for further enhancing the content optimised data backup/archival system described above. In particular, the arrangement of the present example allows increased efficiency for storage of large data objects.

Figure 5:
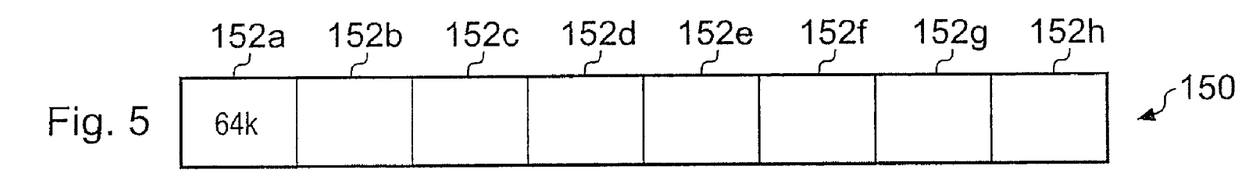
FIG. 5 shows an example data file.

As shown in FIG. 5, an example data file 150 having a size of 512 kB may be considered as eight segments 152a, 152b, 152c, 152d, 152e, 152f, 152g and 152h of 64 kB each for the purposes of a data backup process.

Figure 6:
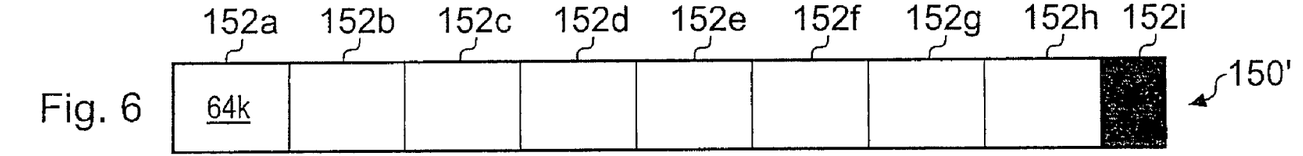
FIG. 6 shows the example data file of FIG. 6 in a first modified form.

If data is later appended to this file (as shown in FIG. 6), such as might be the case if the data file is an Outlook™ .pst file, then the modified file 150' will include the original segments 152b-h, and a new segment 152i. This is analogous to the example described above with reference to FIG. 3.

However, if the file is modified by the addition of data in the middle of the file, such as might be the case with a word processor or spreadsheet file where data is not necessarily stored in the file in the order in which it was added to the file, then large amounts of the file may appear changed if viewed in fixed sized segments starting at the beginning of the file. Other files which might fall into this category include other "office" files such as presentation files, as well as image files and video files.

Figure 7A:
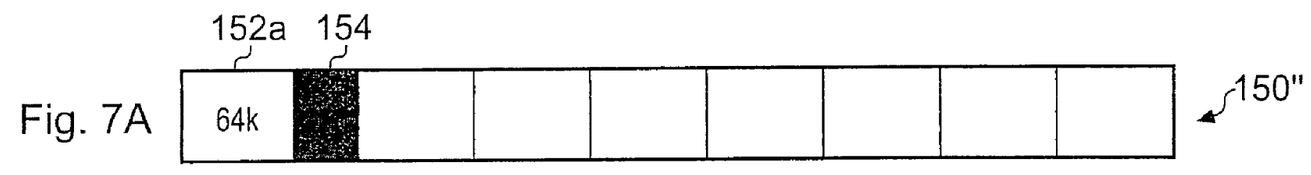
FIG. 7a shows the example data file of FIG. 5 in a second modified form.

This situation is illustrated in FIG. 7a, where modified file 150" includes new data 154 immediately after the end of the first segment 152a. Thus all of the data making up segments 152b-h in file 150 of FIG. 5 are pushed back relative to the start of the file 150".

Figure 7B:
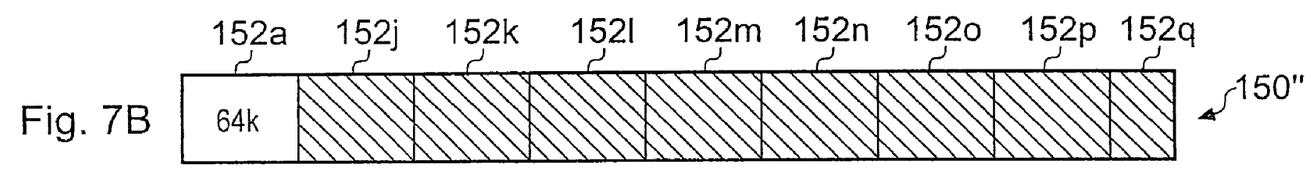
FIG. 7b shows the example data file of FIG. 7a according to a first segmentation approach.

The effect of this on the segmentation of the file when later analysed for backup is illustrated in FIG. 7b. As the segmentation starts at the start of the file and counts along the length of the file, only segment 152a is identified as present in the modified file 150". Even though only a small amount of actual new data is present, the position of that new data has shifted the segment boundaries such that old segments 152b-h are not found and the file is identified as containing new segments 152j-q, all of which are unique compared to the original file and will therefore be backed-up during a backup operation. Thus, even though only less than 10% data has been added to file 150 to make modified file 150", up to 90% extra backup space is used in the illustrated example.

To address this situation, an arrangement whereby segments can have variable sizes can be implemented to optimise the backup system to avoid repeat backing-up of the same actual data when moved to a different position in the file.

Figure 8:
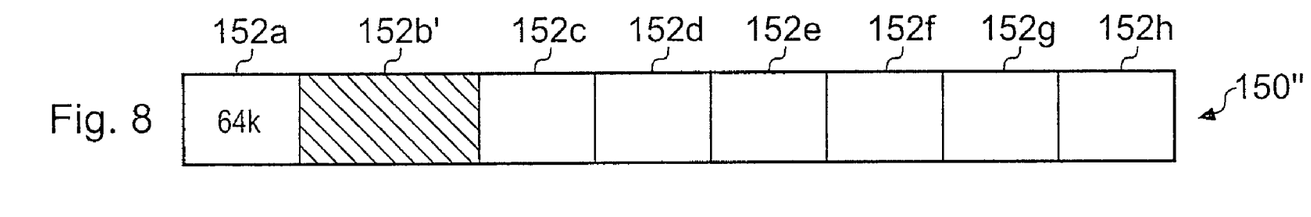
FIG. 8 shows the example data file of FIG. 7a according to a second segmentation approach.

The operation of such a system is illustrated in FIG. 8. Here, the modified file 150" includes the additional data 154 as shown in FIG. 7a. However, in this example, a flexible segment boundary system has been used to minimise unnecessary re-backing-up of data. Thus segment 152a is present, followed by an extended segment 152b' which, in the present example, includes the new data 154 and the content of old segment 152b. After this extended segment, the original segments 152c-h are all present. Thus the data identified for backup will include only new extended segment 152b', as all other segments will have been previously backed-up.

In another implementation of this type of scheme, file 150' illustrated in FIG. 8 could have had an additional segment added corresponding only to the new data 154, such that all of original segments 152a-g would remain.

An example in which the performance gain of such a system is emphasised is that of a very large file, such as a video file. If the file has a starting size of 1 GB (1,048,576 kB), and is segmented into 64 kB segments, then the file will include a total of 16,384 segments. If the file is edited near the start of the video (for example to alter a transition effect during an opening title portion of the video) such that the second segment grows in size by 10%, this means that from the $3^{rd}$ segment onwards each segment is misaligned with its original window on the file.

Thus, if the system of FIG. 7b is followed, of the 16,384 segments, only 2 align correctly such that the remaining 16,382 segments appear to have altered relative to their state when previously stored. Thus for an absolute change of data in the file of 0.0006104%, the fixed boundary segmenting system would find a detected change in the file of 99.9878%, resulting in a massive amount of unchanged data being re-stored during a backup process.

On the other hand, if the system of FIG. 8 is followed, the one altered segment would be identified as changed and have its boundaries adjusted appropriately, and all of the remaining 16,383 segments will correctly align with the altered file. Thus the detected change in the file would be only 0.0061035%.

In the following, examples of methods and apparatus for implementing such a movable boundary segment system will be described.

As will be appreciated, the fixed segment size system described above allows segments of any size smaller than the predetermined maximum segment size, such that files smaller than the segment size, and the ends of files larger than the maximum segment size but having a size not equal to an exact multiple of the maximum segment size can be handled as segments.

To enable file segments in the store to be rebuilt into the original files as and when required, each stored file has created therefor a file representation, which includes information related to the segmentation of the file, including an indication of the number of segments, the maximum segment size, a list of the hash result (fingerprint) for each segment, a list of the cyclical redundancy check (CRC) result for each segment, a list of the size of each segment, and a list of a segment boundary identifier for each segment.

The maximum segment size specifies the largest size that a segment in the file may have. Segments may be smaller than this size, but not larger.

The segment data lists of the file representation are ordered such that the $n^{th}$ element in each of the CRC list, size list and boundary identifier list, corresponds in list position to the $n^{th}$ element in the fingerprint list. Using such a list structure facilitates easy reconstruction of the original file: by retrieving data from the store according to the order of the segment fingerprint list, the original file is properly reconstructed. These lists when taken together may be considered to be the list of segment values.

The segment hash (fingerprint) list contains known hash values (fingerprints) for all segments the original file is composed of. The hashing algorithm of the present example (the MD5 function) is such that the likelihood of apparent hash collision is extremely low (at least equal to or smaller than 1 over 2 to the power 128, that is, one in three hundred trillion trillion trillion) such that no concern over collisions is necessary for an implementer of such a system.

The segment boundary identifier is an identifier for a segment and is computed when a segment is first stored by feeding data to a semantor (semantic analyser) function. The purpose of this value is to allow detection of a segment boundary at which, with an acceptable degree of uncertainty, a match with a currently stored segment for a given file representation can be established. In its plainest form, the semantor function simply contains the leading N bytes of a segment. In more complex forms, the semantor function can deploy a variety or combination of parity, checksum, hashing or other algorithms (including both lossless and lossy) to compute said number. The selected algorithm may be such that it is CPU friendly (i.e. has a low processing overhead) and it allows, within an acceptable degree of uncertainty, to assess whether or not a potential match is encountered.

To limit the number of potential boundary identifier collisions (a boundary identifier collision can occur if two segments share the same boundary identifier but have different data before or after the N bytes that were used to generate the identifier), several optimisations can be applied to the semantor. Three such optimisations are:

A unique boundary identifier algorithm. This optimisation can be used to ensure that a generated boundary identifier is unique for all segments contained within a file representation. Depending on the selected semantor, this optimisation can require an offset into the provided segment data to be stored in either the file representation or the boundary identifier. If a lossless semantor is used, it is noted that it might not always be possible to generate a unique boundary identifier, for example if the file representation includes repeated identical segments.

An adaptive boundary identifier algorithm. In this form, the algorithm can exclude certain byte values that possess certain properties (i.e., repetitive byte sequences). An example where this can be useful are files containing a considerable amount of bytes with a value of 00 or FF (such as can occur in sparse files or database files). This optimisation requires that the excluded byte values and repeat count are stored within either the fire representation or the boundary identifier. For example, a simple Runtime Length Encoding (RLE) algorithm would suffice to store this information. RLE is a simple and CPU-inexpensive compression algorithm in which a sequence of bytes is encoded as the byte value followed by a repeat count, i.e., RLE encoding of the string 'AAAABB' results in the string 'A4B2'. Examples of properties that could be used are bytes which match an exact value, bytes in which a specific bit is set/unset, bytes whose value represents a power of 2, etc. . . . . .

A unique adaptive boundary identifier algorithm, being a combination of the above two techniques.

The value of N depends on the actual segment size and should be chosen such that N offers a high probability that if a match of unknown data with a segment boundary identifier occurs, the remainder of the unknown data represents known data. The smallest value of N in the present example is one byte. The algorithm used to establish the N value is such that N is exactly known for a given range of possible segment sizes. It will be appreciated that N cannot be larger than the actual segment size.

The selected semantor function can be made content dependant, in which case the type of semantor function must be stored in the file representation as well.

A simple means by which N can be established is by using a lookup table, such as that illustrated in Table 1. Table 1 shows the N values used in the present example for various segment sizes.

TABLE 1

| Segment size (/bytes) | <=16 | >16, <=1024 | >1024, <=8192 | >8192 |
|---|---|---|---|---|
| N Value | = segment size | 16 | 32 | 64 |

In another example of an implementation for determining N comprises selecting a proper N value on a case-by-case basis by performing a semantic analysis (or variant thereof) of the segment data or file data. A semantic analysis could, for instance, allow one to determine if the content is ordered (such as in a text document) or unordered (such as in an encrypted file). In the case of the latter, a high value of N can be used as it is unlikely that changes are large. In the case of the former, a small value of N can be used as it is likely that changes are small. It is appreciated that if an N value is established on a per-segment bases, the N value for each individual segment must be maintained in the file representation.

It will also be recognised that the segment boundary identifier can be chosen to represent a portion of segment data starting at an index other than the start of the segment. In this case, the offset of said portion within said segment must be stored within the file representation and the algorithms described below must accordingly take this into account. For the sake of clarity, the remainder of this example assumes that said offset corresponds with index 0 of said segment.

Figure 9:
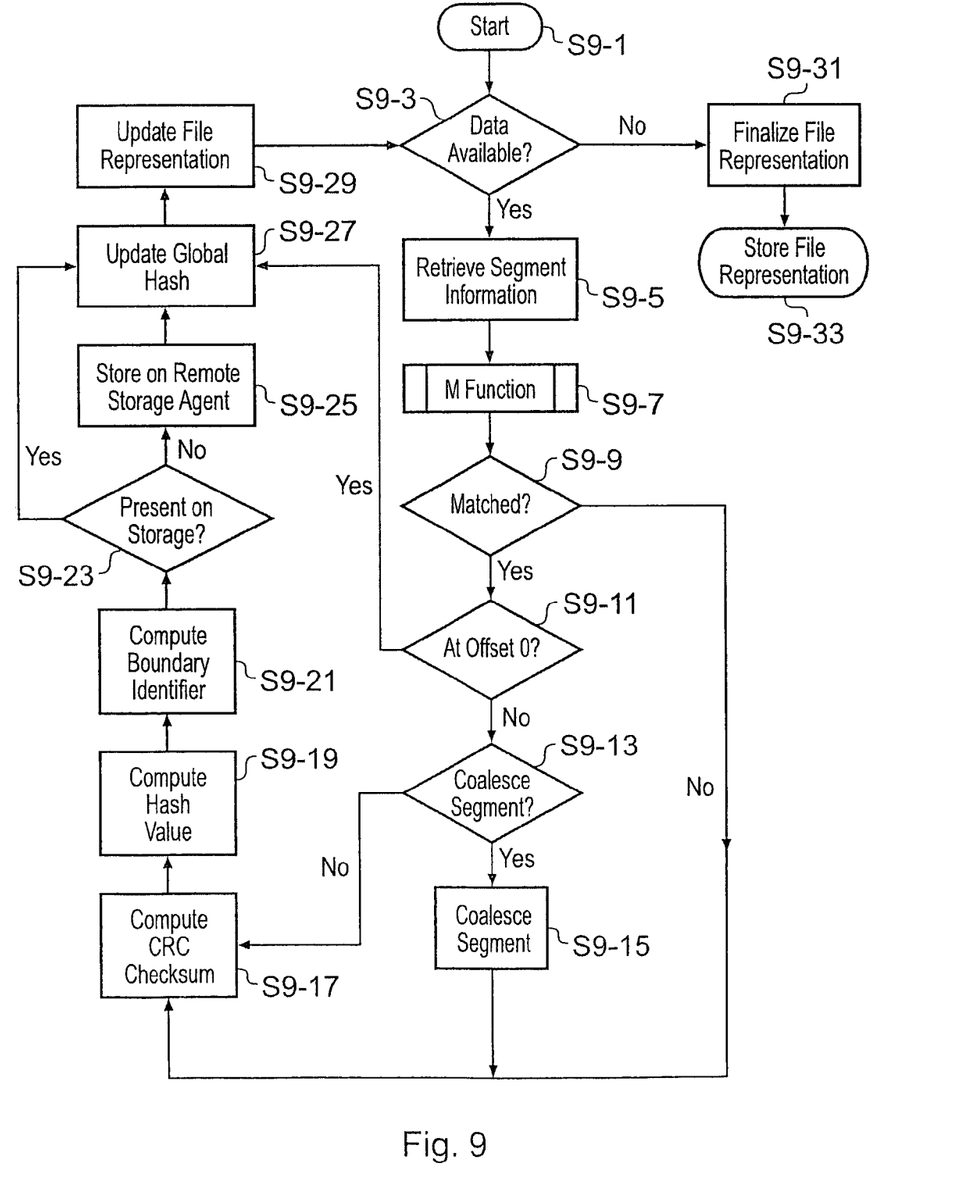
FIG. 9 shows a flow chart of a method for using a segment boundary identifier in a single instance store.

With reference to FIG. 9, a method for using the segment boundary identifier to implement a flexible segment size system will now be described.

The present example method assumes that a manner exists in which it can be determined that an apparent new file represents a modification of an existing file representation. This could be determined in a number of ways, for instance by maintaining a mapping between the physical location of a file in a network of computer systems and the associated file representation, either directly or by establishing the address of said file representation on a remote storage agent.

The present example also assumes that the data object for storage is available at the local computer system.

The method starts at Step S9-1 where a boundary identifying method is initiated for a file which has been identified for inclusion in a backup/archival process. A hash value computation for the entire file is initiated, which will be updated at Step S9-27 below for each segment of the file.

Then, at Step S9-3, a check is performed to determine whether any segments require processing. Upon the first cycle through the method, there will always be a segment requiring consideration, as any file must have a size, which will result in that file including at least one segment. If it is determined at Step S9-3 that data is available, then processing continues at Step S9-5 where data relating to the next segment of the file is retrieved. This segment is termed the "trial segment" during the process of considering it for a movable window.

The trial segment is identified by selecting the next segment in line from the list of segment values from the file representation of the file being considered. During the first loop of this method for a given file, a new file representation is created at this stage, including the number of segments and maximum segment size from the original file representation for the file being considered. Then, a number of bytes equal to the maximum segment size is read from the file for consideration as the trial segment. On later cycles through the method, only the reading of the next set of bytes (equal to the maximum segment size) is performed.

Then, at step S9-7, the M-Function is performed. The M-Function will be described in greater detail with reference to FIG. 10 below. The M-Function tests the trial segment to determine whether it matches a previously stored segment of the file representation and returns one of a successful match result and a match failure result. A successful match result includes a segment index which identifies the matched, already-stored segment from the list of segments from the original file representation and an input offset which indicates the offset from the start of the matched segment at which the boundary match was found.

At Step S9-9 a check is performed to determine whether a successful match result or a match failure result was returned. If no match was returned processing continues at Step S9-17 below.

If the M function does not yield a match, it can be reasonably assumed that the data contained in the input buffer represents either an inserted (i.e. new) segment, or a modification extending beyond the maximum segment size or the previously known file size (i.e. the file has grown).

On the other hand, if it is determined at Step S9-9 that a successful match result was returned by the M-Function, then processing continues at Step S9-11.

At Step S9-11, a check is performed to determine whether the input offset returned as part of the successful match result from the M-Function has a value of zero. If the offset has zero value, this means that the M-function found a match at the start of an already stored segment, such that the trial segment being considered for storage has already been stored (and thus no further boundary shift or storage operations are necessary for that trial segment). Processing therefore continues at Step S9-27 below.

On the other hand, if the offset does not have zero value, then it is apparent that a portion of the trial segment has changed relative to the previously stored segment identified by the M-Function. It can thus be reasonably assumed that said portion has not previously been included in the archival/backup storage system and processing continues at Step S9-13.

At step S9-13, a check is performed to determine whether the trial segment needs coalescing. This check includes determining the size of segment that would result if the portion of the matched segment found by the M-Function which follows after the offset position and the next segment were to be coalesced into a single larger segment. The calculation to achieve this is a check on whether the total of (the trial segment size, minus the offset value from the M-Function, plus the size of the segment identified by the M-Function) is greater than the maximum segment size. If this total is greater than the maximum segment size, then segment coalescence cannot occur as the maximum permitted segment size would be exceeded. Processing therefore continues at step S9-17.

On the other hand, if it is determined at Step S9-13 that the total is equal to or less than the maximum segment size, then coalescence can occur, and processing continues at Step S9-15. At Step S9-15, said segments are coalesced into one: the data corresponding to the matched segment identified by the M-Function is read from the input file and appended to the changed portion of the trial segment. This coalescence prevents a file from becoming too fragmented (i.e. constituted of large number of segments each being much smaller than the maximum segment size). This new coalesced segment is now the trial segment, and the size of the trial segment becomes the size of the portion not previously stored plus the size of the segment identified by the M-Function. Note that coalescence is normally only possible if the segment identified by the M-Function is either a reduced size segment resulting from a previous invocation of this method onto the stored segments, or the final segment of a file, as all other segments would normally be expected to already be as large as the maximum segment size.

Following coalescence of segments at Step S 9-15 or a determination that coalescence is not possible at Step S9-13, processing continues at step S9-17.

At Step S9-17 CRC checksum for the new trial segment is calculated. Next, at Step S9-19, the hash value (fingerprint) for the new trial segment is calculated. Then, at step S9-21, the segment boundary identifier for the new trial segment is calculated.

Following the calculation of the hash value, the CRC checksum and the boundary identifier for the new trial segment (Steps S9-19 to 21) processing continues at Step S9-23.

At Step S9-23, a check is performed to determine whether the trial segment has already been stored in the archival/backup system. As described above, this can be performed using the hash value for the trial segment.

If it is determined at Step S9-23 that the trial segment has not already been stored, then, at Step S9-25, the trial segment is stored into the backup/archival system.

If it is determined at Step S9-23 that the trial segment has already been stored, or following storage of the trial segment at Step S9-25, or following a determination that the matched segment from the M-Function has zero offset at Step S9-11, processing continues at Step S9-27.

At Step S9-27, the file hash value is updated to include the data of the trial segment.

Then, at Step S9-29, the trial segment CRC checksum, hash value, size, boundary identifier, and boundary identifier N value are appended to the new file representation.

Next, processing returns to Step S9-3 where it is determined whether any more data segments remain to be considered. Once all of the segments in the file have been considered, processing continues at Step S9-31 where the final number of segments is adjusted as necessary to correctly reflect the number of segments for this file representation, and the computed hash value for the entire file is also added.

Finally, at Step S9-33, the new file representation is stored in the archival/backup system.

Figure 10:
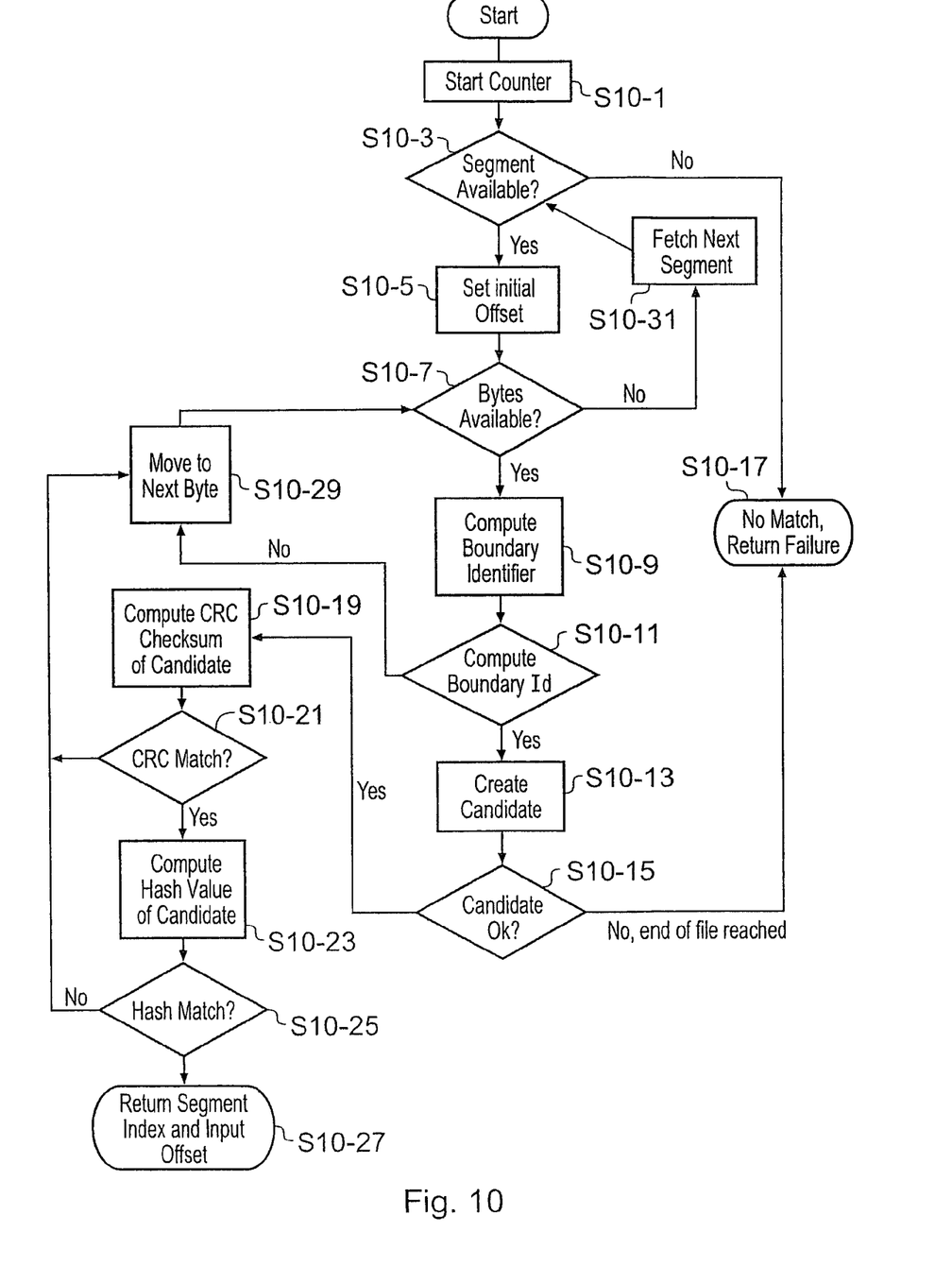
FIG. 10 shows a flow chart of a method for determining whether a first segment matches a second segment at one of a plurality of offset conditions.

The M-Function (Step S9-7) will now be described in greater detail with reference to FIG. 10. As described above, the M-Function tests the trial segment to determine whether it matches a previously stored segment of the file and returns one of a successful match result and a match failure result.

The algorithm described below uses a simple forward scan algorithm to match segment boundary identifiers.

The M-Function (or matching function) starts at step S10-1, where a segment counter, i, is started with an initial value of zero.

Next, at Step S10-3, a check is performed to determine whether any segments are available for test matching to the trial segment passed to the M-Function by step S9-5 (as described with reference to FIG. 9 above). The first time that the method of this example is performed, there will be available segments as the original file will have a size and therefore will include at least one segment.

Thus, for the first iteration at least, processing continues at Step S10-5 where an offset counter, o, is started with an initial value of zero.

Next, at step S10-7, a check is performed to determine whether any more bytes of the trial segment are available for testing. When performing this check the first bytes of the trial segment are ignored according to the current value of the offset counter. This offset is initially zero, as noted above, such that the first iteration of the method for each segment is performed with zero offset (resulting in no bytes of the trial segment being ignored). Trial segment bytes are available if the trial segment size minus the current offset in bytes is greater than or equal to (but not less than) the N value for the segment boundary identifier of the segment of the original file currently being used for testing (i.e. the $i^{th}$ segment of the original file). Assuming that the N value for the segment boundary identifier of the $i^{th}$ segment is smaller than the trial segment (which is likely unless the $i^{th}$ segment is particularly small), there will be bytes of the trial segment available for testing upon the first iteration of the method for each segment of the original file.

Thus, for the first iteration at least, processing continues at Step S10-9 where the boundary identifier for the trial segment is computed, starting from the position in the trial segment indicated by the offset counter value, o. Then, at Step S10-11, the boundary identifier for the trial segment (as calculated at Step S10-9) is compared to the boundary identifier for the $i^{th}$ segment of the original file.

If the two boundary identifiers are found to match at Step S10-13, then a potential match exists. Starting at the position in the trial segment indicated by the current value, of the offset counter, the trial segment has appended thereto bytes (taken in order) from the next segment in the file being considered for storage (i.e. the segment following the trial segment) such that the final number of bytes equals the size of the $i^{th}$ segment in the original file. Thus a candidate segment is created. It will be appreciated that when the offset equals zero and the trial segment and $i^{th}$ segment have the same size that the candidate segment will be identical to the trial segment. It is possible for the candidate segment to be smaller than the trial segment if the $i^{th}$ segment identifies the last segment of the file.

If it is determined at Step S10-15 that insufficient bytes of the file being considered for storage are available for the candidate segment to reach this total size, this indicates that the end of the file has been reached. No more matches are therefore possible and processing continues at step S10-17 where a match failure result is returned from the M-Function, at which time the M-Function ends.

On the other hand, if it is determined at Step S10-15 sufficient bytes are available, then a CRC checksum is calculated for the candidate segment at Step S10-19. This candidate segment CRC checksum is then compared to the CRC checksum of the $i^{th}$ segment of the original file at Step S10-21. If these are found to match, then processing continues at Step S10-23 where the hash value (fingerprint) of the candidate segment is calculated. This candidate segment hash value is then compared to the hash value of the $i^{th}$ segment of the original file at Step S10-25. If these are found to match, then the candidate segment is determined to match a segment of the original file, such that a successful match result is returned, along with the segment index value i and the offset value o. At this stage the M-Function ends.

On the other hand, if it is determined at Step S10-25 that the candidate segment hash value and the $i^{th}$ segment hash value do not match, or if it is determined at Step S10-21 that the candidate segment CRC value and the $i^{th}$ segment CRC value do not match, then the candidate segment has been determined not to match the $i^{th}$ segment and processing continues at Step S10-29. Also, if it was determined at Step S10-11 that the trial segment boundary identifier and the $i^{th}$ segment boundary identifier do not match, processing also continues at Step S10-29.

At Step S10-29 the offset counter o is increased by one (thereby increasing by one the number of initial bytes of the trial segment which will be ignored during the next iteration of the method for the current original file segment (the $i^{th}$ segment). Processing then returns to Step S10-7 where the check for available bytes to process is performed. If bytes are available, the process returns to Step S10-9. On the other hand, if insufficient bytes remain of the trial segment to repeat the method for the current original file segment, then processing continues at Step S10-31.

At Step S10-31, the counter i is incremented to cause the next segment information, which comprises at least the CRC checksum, the hash value and the boundary identifier for the next segment, of the original file to be retrieved for comparison to the trial segment. Processing then continues at Step S10-3 where it is checked whether another original file segment is available. If so, processing returns to Step S10-5. If not, a match for the trial segment is impossible from the original file and processing continues at Step S10-17 where a match failure result is returned and the M-Function ends.

In the above described example, the CRC checksum is calculated and tested prior to calculating and testing the hash value for the candidate segment. This is carried out in this order as there may be many different candidate segments which have a CRC checksum which matches the $i^{th}$ segment checksum, but any candidate segment which has a hash value which matches the hash value for the $i^{th}$ segment is almost certain to match the $i^{th}$ segment (subject to hash function collisions—which occur statistically at a rate of approximately one in every three hundred trillion trillion trillion different segments, as discussed above). Thus, by performing the CRC comparison first, rejections can be made based on the computationally simpler CRC check before calculating the computationally more complex hash value. In other examples, the CRC and hash checks could be carried out simultaneously, in inverse order, or using only the CRC check or only the hash check. It will be understood that the combined use of the CRC and hash checks further reduces the likelihood of a hash function collision occurring as the two data patterns causing the hash function collision may have different CRC values.

Thus there have now been described apparatus and a method for implementing flexible boundaries in file segmentation. By means of these, storage in an archival/backup system can be optimised for efficiency and manageability.

With reference to the above-described system and apparatus, various modifications and alterations which may be made will now be discussed in detail.

In some examples, the segments can be checked for identify with an existing segment in a different manner. In some implementations, only the CRC checksum value or only the hash value are used for this. In other implementations another type of functions serving the purpose of creating an identifier for a given data set can be used. Examples of suitable functions include; the sum of all individual byte values, and the total number of bytes that have a specific bit set or equal a specific value. These functions share with the CRC and hash values the property that it is unlikely that another data set will generates the same identifier.

Figure 11:
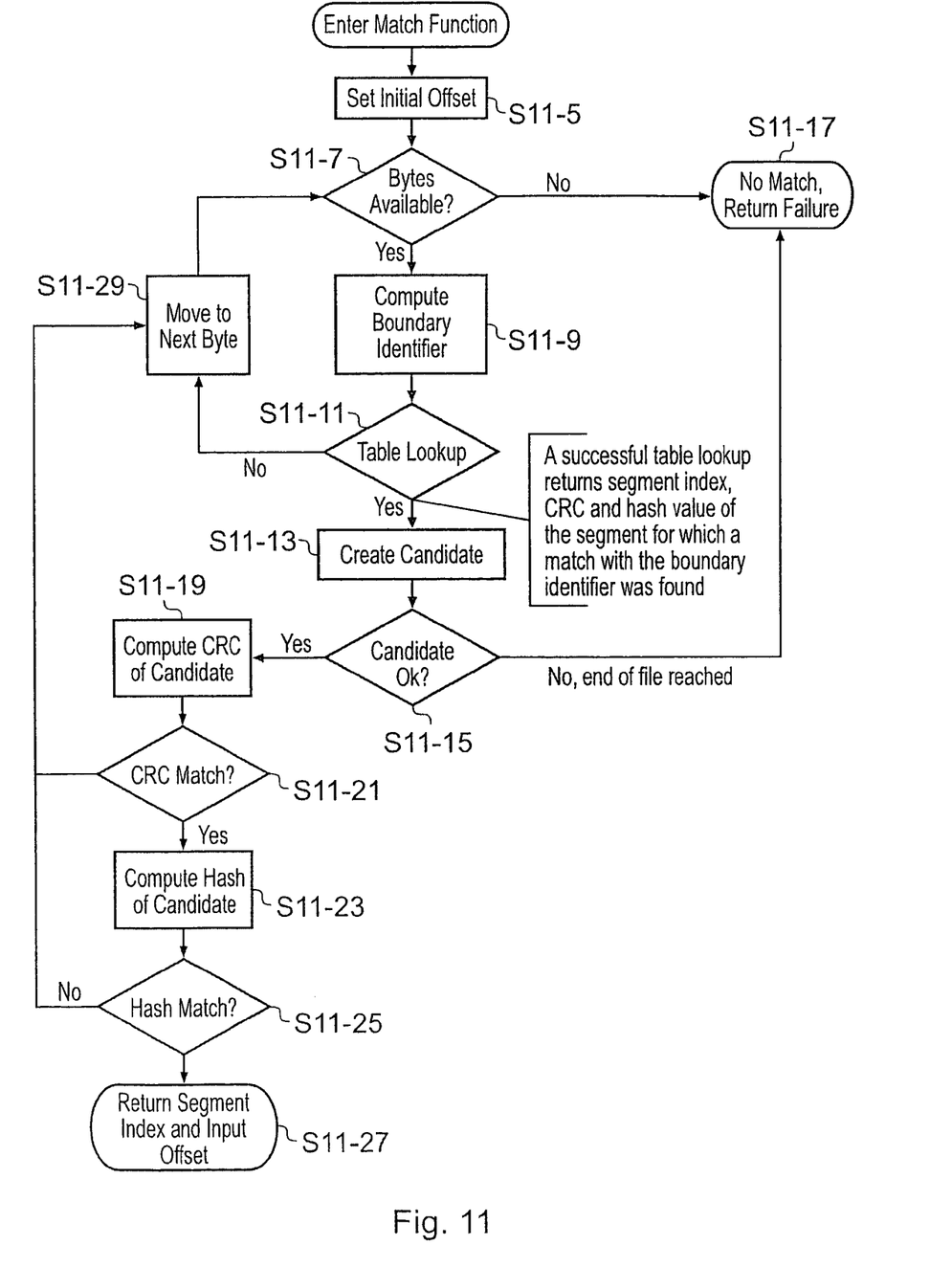
FIG. 11 shows a flow chart of another method for determining whether a first segment matches a second segment at one of a plurality of offset conditions.

In some examples, a different search algorithm to perform boundary identifier searches could be used. An example of an alternative search function is illustrated in FIG. 11. The search function of FIG. 11 is a per segment search which can be used to replace the search function of FIG. 10 (steps S10-5 to S10-29) discussed above.

Processing starts at step S11-5 where an offset counter, o, is started with an initial value of zero.

Next, at step S11-7, a check is performed to determine whether any more bytes of the trial segment are available for testing. When performing this check, the first bytes of the trial segment are ignored according to the current value of the offset counter. This offset is initially zero, as noted above, such that the first iteration of the method for each segment is performed with zero offset (resulting in no bytes of the trial segment being ignored). Trial segment bytes are available if the trial segment size minus the current offset in bytes is larger than or equal to (but not less than) the N value for the segment boundary of the segment of the original file currently being used for testing (i.e, the $i^{th}$ segment of the original file). Assuming that the N value for the segment boundary identifier is smaller than the trial segment, there will be bytes of the trial segment for testing upon the first iteration of the method for each segment of the original file.

Thus, for the first iteration at least, processing continues at Step S11-9 where the boundary identifier for the trial segment is computed, starting from the position in the trial segment indicated by the offset counter value, o. Then, at Step S11-11, a table lookup for the computed boundary identifier is performed. This table contains the segment information of the original file representation and contains at minimum the boundary identifier values, CRC checksum values and hash values of each segment of the original file. The table lookup can be performed by a variety of known search algorithms (examples of which are binary tree search, linear search, hash search, etc. . . . ).

If a boundary identifier match is found at Step S11-11, then a potential match exists. The result of the table lookup performed at Step S11-11 is the index value, i, of the original segment, the CRC checksum value and the hash value of the original segment. Starting at the position in the trial segment indicated by the current value, of the offset counter, the trial segment has appended thereto bytes (taken in order) from the next segment in the file being considered for storage (i.e. the segment following the trial segment) such that the final number of bytes equals the size of the $i^{th}$ segment in the original file. Thus a candidate segment is created. It will be appreciated that when the offset equals zero and the trial segment and $i^{th}$ segment have the same size that the candidate segment will be identical to the trial segment. It is possible for the candidate segment to be smaller than the trial segment if the $i^{th}$ segment identifies the last segment of the file.

If it is determined at Step S11-15 that insufficient bytes of the file being considered for storage are available for the candidate segment to reach this total size, this indicates that the end of the file has been reached. No more matches are therefore possible and processing continues at step S11-17 where a match failure result is returned from the M-Function, at which time the M-Function ends.

On the other hand, if it is determined at Step S1-15 sufficient bytes are available, then a CRC checksum is calculated for the candidate segment at Step S11-19. This candidate segment CRC checksum is then compared to the CRC checksum of the $i^{th}$ segment of the original file at Step S11-21. If these are found to match, then processing continues at Step S11-23 where the hash value (fingerprint) of the candidate segment is calculated. This candidate segment hash value is then compared to the hash value of the $i^{th}$ segment of the original file at Step S11-25. If these are found to match, then the candidate segment is determined to match a segment of the original file, such that a successful match result is returned, along with the segment index value i and the offset value o. At this stage the M-Function ends.

On the other hand, if it is determined at Step S11-25 that the candidate segment hash value and the $i^{th}$ segment hash value do not match, or if it is determined at Step S11-21 that the candidate segment CRC value and the $i^{th}$ segment CRC value do not match, then the candidate segment has been determined not to match the $i^{th}$ segment and processing continues at Step S11-29. Also, if it was determined at Step S11-11 that the trial segment boundary identifier did not identify a known segment boundary identifier, processing also continues at Step S11-29.

At Step S11-29 the offset counter o is increased by one (thereby increasing by one the number of initial bytes of the trial segment which will be ignored during the next iteration of the method for the current original file segment (the $i^{th}$ segment). Processing then returns to Step S11-7 where the check for available bytes to process is performed. If bytes are available, the process returns to Step S11-9. On the other hand, if insufficient bytes remain of the trial segment, then a match for the trial segment is impossible and processing continues at Step S11-17 where a match failure result is returned and the M-Function ends.

Thus there have now been described methods which can be used to implement a moving windows schema for a file segmentation scheme in an archival/backup system. As will be appreciated, this system can be used in environments where the original file is not available to perform a direct comparison. Thus, there is no need to retrieve a stored earlier file version to a backup appliance or client in order to maximise the efficiency of checking a later file version to determine which segments have already been stored and which have changed, thus themselves requiring transmittal to storage. Thereby an efficient storage regime may be implemented without a requirement to ship previously stored items out to storage assessment agents such as backup clients.

Thus there have been described various approaches to implementing a variable segment size system for a file archival/backup system. Thereby a greater efficiency of single instancing can be effected in the archival/backup system.

The invention claimed is:

1. A method, comprising:
   generating a plurality of candidate segments from a selected trial segment of a selected data file, each candidate segment corresponding to a start position offset from the start of the trial segment and having data appended thereto from a next segment of the selected data file as necessary to maintain a constant candidate segment size;
   comparing a boundary parameter of each candidate segment to a boundary parameter of a previously stored segment to determine a comparison result;
   if the comparison result indicates that a candidate segment potentially corresponds to the previously stored segment, comparing a segment identifier value for the candidate segment to a segment identifier value for the previously stored segment to determine whether the candidate segment is the same as the previously stored segment; and
   sending to a backup storage a trial segment if none of the candidate segments generated therefrom are determined to have previously been stored.

2. The method of claim 1, wherein the previously stored segment is a segment of a previously stored version of the selected data file.

3. The method of claim 1, wherein the segment identifier value is at least one of a cyclic redundancy check value and a hash function value.

4. The method of claim 1, wherein the boundary parameter of each candidate segment is calculated by performing a semantic analysis of the candidate segment.

5. The method of claim 4, further comprising performing the semantic analysis.

6. The method of claim 5, wherein the semantic analysis is performed such that a boundary parameter for a given segment of a data file is different from a boundary parameter for all other segments of that data file.

7. The method of claim 4, further comprising excluding at least one predetermined byte pattern in a segment when determining the boundary parameter therefore.

8. The method of claim 7, wherein the at least one predetermined byte pattern includes a repetitive byte sequence.

9. The method of claim 7, wherein a record of ignored bytes is included in the boundary parameter or in an object representation associated with the selected data file.

10. The method of claim 1, wherein the boundary parameter and segment identifier value for the previously stored segment are stored in a data object representation for a previously stored data object to which the previously stored segment belongs.

11. The method of claim 1, further comprising, in the event of determining that the candidate segment corresponds to the previously stored segment, outputting an indication of the start position offset at which the match was determined.

12. The method of claim 11, further comprising creating a new segment containing contiguous data from the start of the trial segment having a size equal to the start position offset; and sending the new segment to the backup storage.

13. The method of claim 12, further comprising consolidating the new segment with one of a previous segment and a next segment; and sending the consolidated segment to the backup storage.

14. The method of claim 13, wherein the consolidating is performed if the consolidated segment would have a size less than or equal to a predetermined maximum segment size.

15. The method of claim 1, wherein an offset value used to generate a candidate segment falls into a range of zero to the size of the candidate segment.

16. A method for identifying data object segments for inclusion in single instance storage, the method comprising:
   generating a plurality of candidate segments from a selected trial segment of a selected data object, each candidate segment corresponding to a start position offset from the start of the trial segment and having data appended thereto from a next segment of the selected data object as necessary to maintain a constant candidate segment size;
   comparing a boundary parameter of each candidate segment to a boundary parameter of a previously stored segment to determine whether the candidate segment potentially corresponds to the previously stored segment;
   if it is determined that a candidate segment potentially corresponds to the previously stored segment, comparing a segment identifier value for the candidate segment to a segment identifier value for the previously stored segment to determine whether the candidate segment is the same as the previously stored segment.

17. The method of claim 16, further comprising creating a new segment containing contiguous data from the start of the candidate segment having a size equal to the offset value.

18. The method of claim 17, further comprising consolidating the new segment with one of a previous segment and a next segment.

19. A system, comprising:
   a processor;
   a memory storing program instructions executable by the processor to:
      generate a plurality of candidate segments from a selected trial segment of a selected data file, each candidate segment corresponding to a start position offset from the start of the trial segment and having data appended thereto from a next segment of the selected data file as necessary to maintain a constant candidate segment size;
      compare a boundary parameter of each candidate segment to a boundary parameter of a previously stored segment to determine a comparison result;
      if the comparison result indicates that a candidate segment potentially corresponds to the previously stored segment, compare a segment identifier value for the candidate segment to a segment identifier value for the previously stored segment to determine whether the candidate segment is the same as the previously stored segment; and
      send to backup storage a trial segment if none of the candidate segments generated therefrom are determined to have previously been stored.

* * * * *